(12) United States Patent
Derman

(10) Patent No.: US 11,519,551 B1
(45) Date of Patent: Dec. 6, 2022

(54) FRICTIONLESS ROTATING HANGER

(71) Applicant: Jay S Derman, Carlsbad, CA (US)

(72) Inventor: Jay S Derman, Carlsbad, CA (US)

( * ) Notice: Subject to any disclaimer, the term of this patent is extended or adjusted under 35 U.S.C. 154(b) by 0 days.

(21) Appl. No.: 17/838,040

(22) Filed: Jun. 10, 2022

Related U.S. Application Data

(60) Provisional application No. 63/215,062, filed on Jun. 25, 2021.

(51) Int. Cl.
    *B42F 13/00* (2006.01)
    *F16M 13/02* (2006.01)
    *F16B 1/00* (2006.01)

(52) U.S. Cl.
    CPC ............. *F16M 13/022* (2013.01); *F16B 1/00* (2013.01); *F16B 2001/0035* (2013.01)

(58) Field of Classification Search
    CPC .. F16M 13/022; F16B 1/00; F16B 2001/0035
    USPC .................................................. 248/341, 339
    See application file for complete search history.

(56) References Cited

U.S. PATENT DOCUMENTS

| | | | | |
|---|---|---|---|---|
| 4,728,016 A | * | 3/1988 | McPhee | A47G 25/32 223/89 |
| 2010/0083531 A1 | * | 4/2010 | Hu | D06F 34/26 34/565 |
| 2015/0176899 A1 | * | 6/2015 | Jacques | F26B 21/004 211/85.7 |

* cited by examiner

*Primary Examiner* — Todd M Epps

(57) ABSTRACT

A rotating hanger device includes a tube made of a non-magnetic material and a rod supported within the tube via a magnetic levitation assembly.

11 Claims, 4 Drawing Sheets

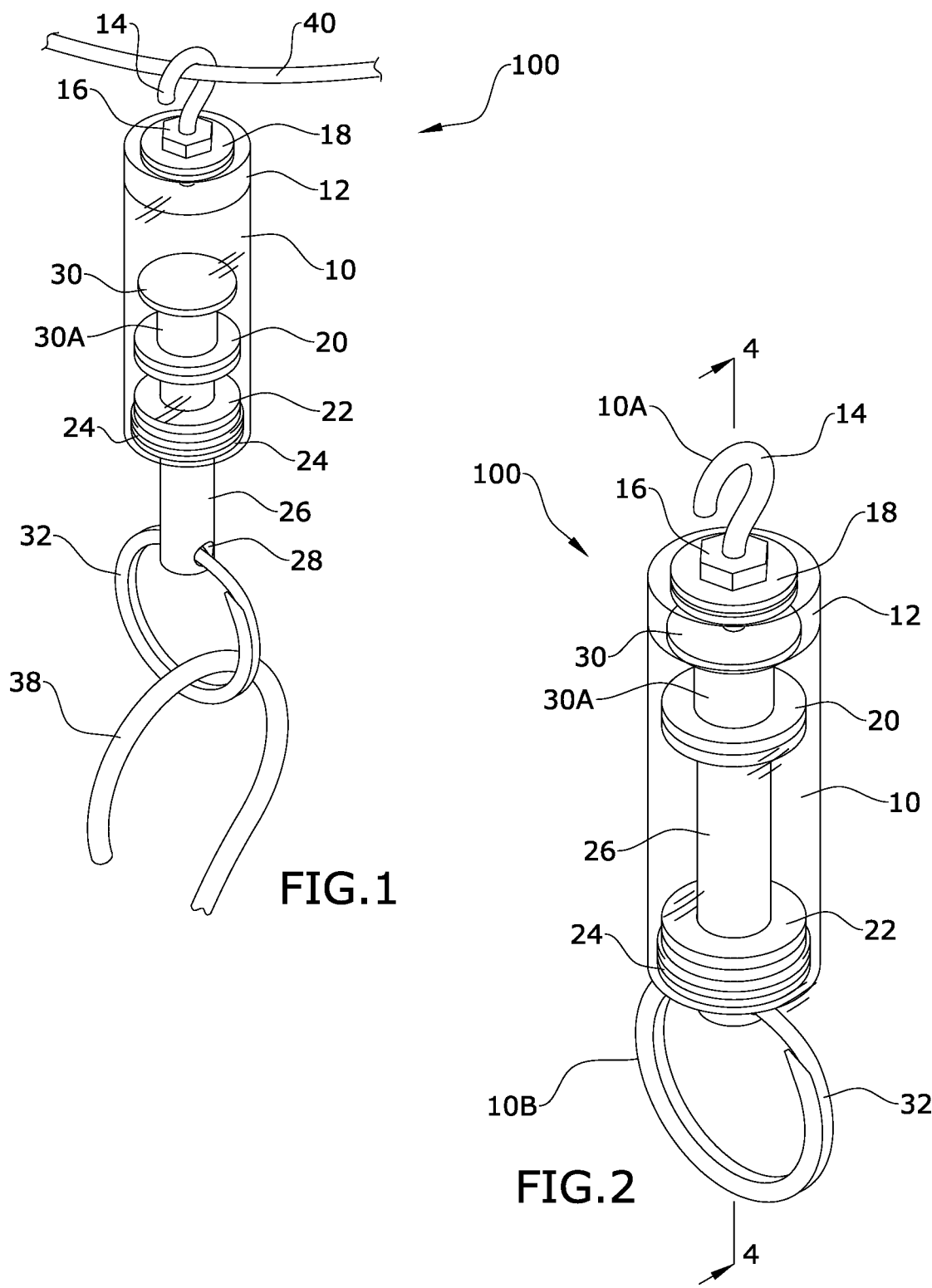

FRICTIONLESS ROTATING HANGER

RELATED APPLICATION

This application claims benefit to U.S. Provisional Application No. 63/215,062 filed Jun. 25, 2021, which is incorporated by reference herein in its entirety.

BACKGROUND

The present disclosure relates generally to spinning hangers.

Spinning hangers used to hang various items may use spinning mechanisms which are slowed down by friction. As such, an improved system is desirable.

SUMMARY

According to various embodiments, disclosed is a rotating hanger device, which may comprise a tube made of a non-magnetic material; a rod supported within the tube via a magnetic levitation assembly housed within the tube; and a bottom hanging assembly coupled to a bottom end of the rod and configured for enabling items to be hung on the rotating hanger device, wherein the rod can move up and down and spin about its longitudinal axis with respect to the tube. In embodiments, the longitudinal axis of the rod is oriented parallel to the longitudinal axis of the tube, and the magnetic levitation assembly comprises at least one upper magnet disk ring and at least one lower magnet disk ring, each including a central opening through which the rod is engaged, wherein the upper magnet disk ring and the lower magnet disk ring face one another in a repelling orientation, and wherein the rod can move up and down and spin about its longitudinal axis with respect to the tube.

BRIEF DESCRIPTION OF THE FIGURES

The detailed description of some embodiments of the invention will be made below with reference to the accompanying figures, wherein the figures disclose one or more embodiments of the present invention.

FIG. 1 is a perspective view of a rotating hanger device shown in use, in accordance with various embodiments FIG. 2 is a perspective view of the rotating hanger device.

DETAILED DESCRIPTION OF CERTAIN EMBODIMENTS

Figure 3:
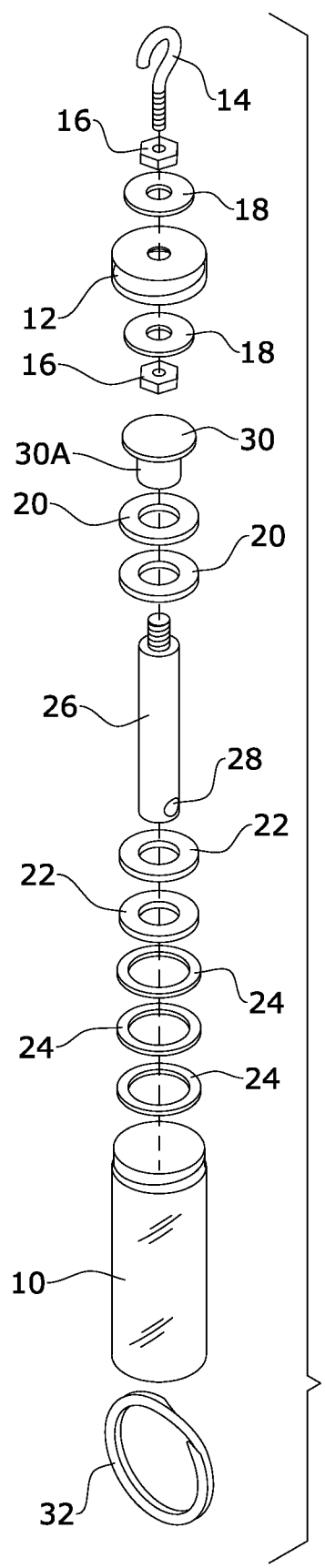
FIG. 3 is an exploded view of the rotating hanger device.
Figure 4:
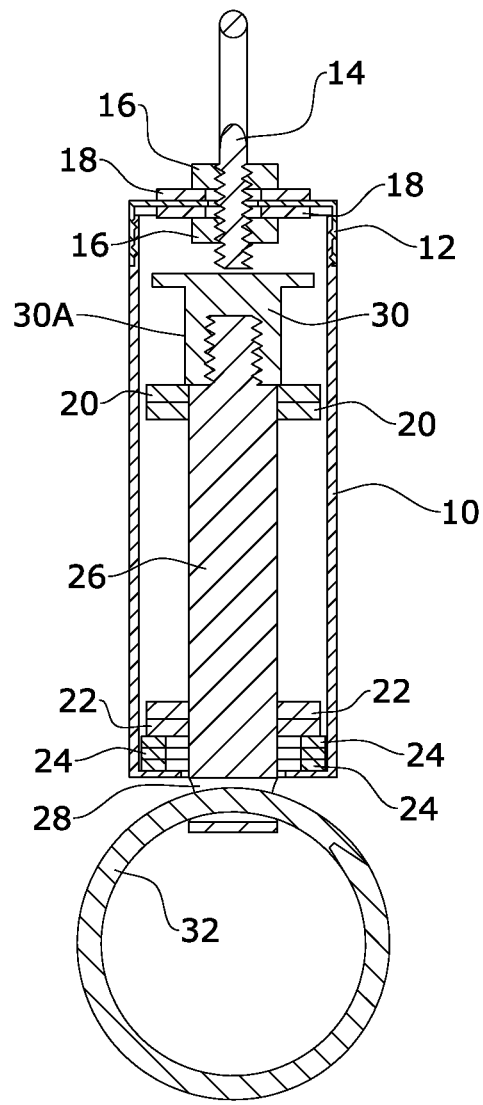
FIG. 4 is a section view, taken along line 4-4 in FIG. 2.
Figure 5:
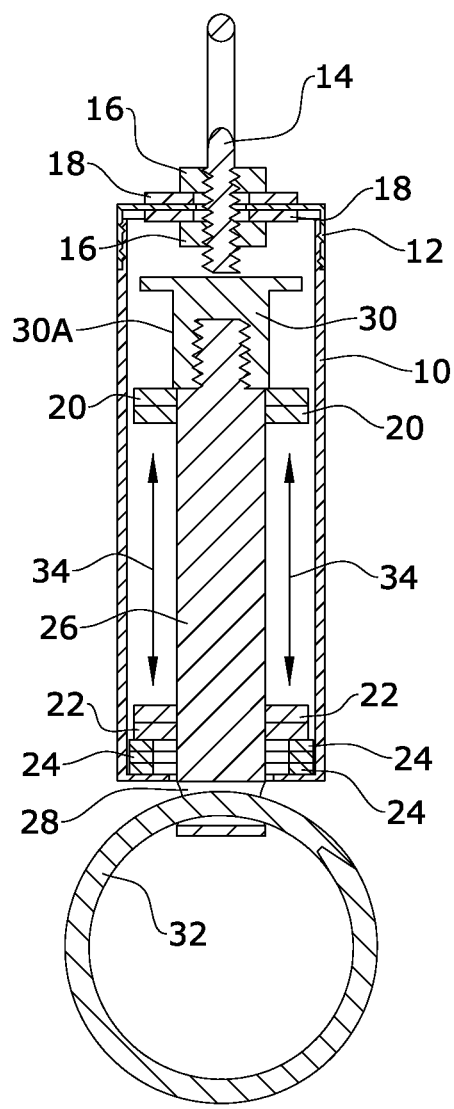
FIG. 5 is a section view of the rotating hanger device, illustrating the effect of magnetic repulsion within the device.
Figure 6:
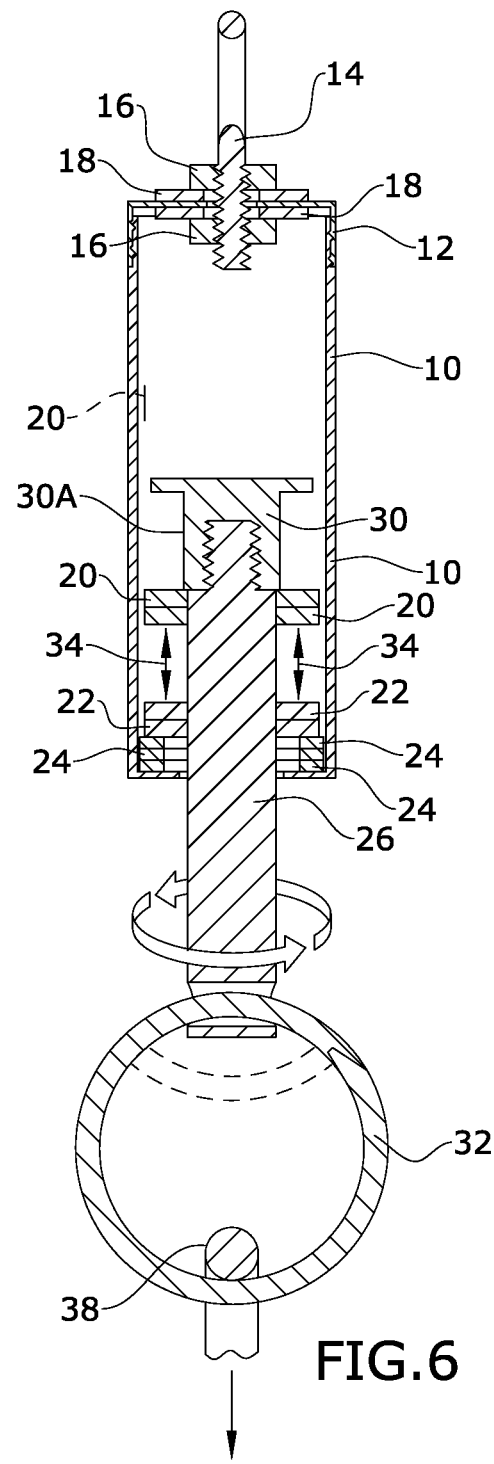
FIG. 6 is a section view of the rotating hanger device, illustrating the effect of weight.
Figure 7:
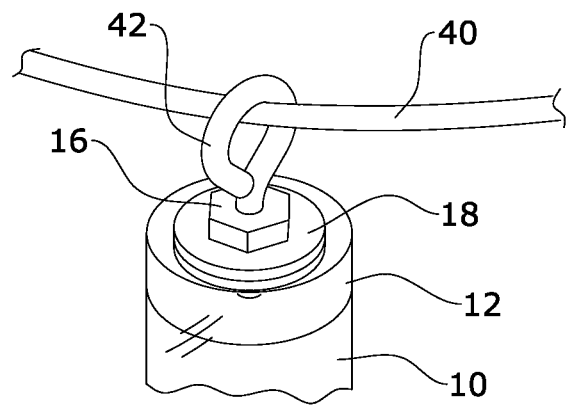
FIG. 7 is a detail perspective view of the invention with an alternate hanging mechanism.
Figure 8:
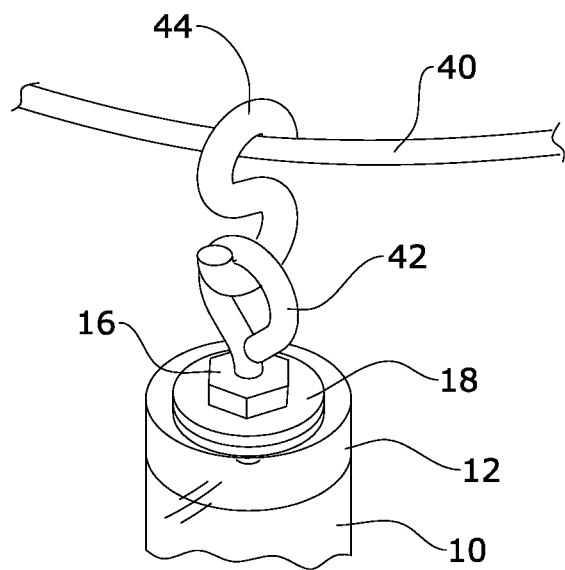
FIG. 8 is a detail perspective view of the invention with another alternate hanging mechanism.

According to various embodiments as depicted in FIGS. 1-8, disclosed is a "frictionless" rotating hanger device 100 comprising a tube and a rod supported within the tube via and a magnetic levitation assembly 10C which enables the rod to spin 360 degrees with minimal frictional resistance. In embodiments, rotating hanger device 100 may further include a top hanging assembly 10A configured for suspending the hanger device, and a bottom hanging assembly 10B for enabling items to be hung on rotating hanger device 100. Various items hung on rotating hanger device 100 may freely spin when exposed to wind, breeze, or other light force. In one embodiment, the hanger may be used for hanging wet clothing for drying outdoors, wherein the spinning motion may cause the cloths to dry faster. In other embodiments, the hanger device may be used for hanging art or other decorative items, which may spin for a visual effect. The hanger may also be used for hanging noise makers such as chimes, bells, and the like for sound effects.

In embodiments, rotating hanger device 100 may generally comprise a non-magnetic tube 10 which supports a non-magnetic rod 26 that is configured to move up and down and spin with respect to the tube. Rod 26 is oriented with its longitudinal axis in line with the longitudinal axis of the tube, and may extend through a bottom opening within the bottom end of the tube. In certain embodiments, rod 26 may be engaged within a central opening of at least one upper magnet disk ring 20, and within a central opening of at least one lower magnet disk ring 22 positioned below the upper magnet disk ring. The upper magnet disk ring 20 and lower magnet disk ring 22 are housed within tube 10 and face one another with repelling polarities to form magnetic levitation assembly 10C. In certain embodiment, lower magnet disk ring 22 may be supported on a bottom wall of tube 26 and/or on one or more bottom rubber washer(s) 24 situated on the bottom wall, wherein the bottom wall includes the opening through which the rod extends.

In certain embodiments, upper magnet disk ring 20 may be configured to move together with rod 26, when rod 26 slides up and down through the opening of lower magnet disk ring 22 and the opening within the bottom end of tube 26. To this end, the rotating hanger device may include a rod top 30, coupled to a top end of rod 26. In one embodiment, rod top 30 may be threadably coupled to a threaded end portion of rod 26, as shown. However, different attachment mechanisms may be employed in various embodiments. In certain embodiments, rod top 30 may have a lower portion/bottom end 30A with a diameter which is larger than the diameter of rod 26 and the opening of upper magnet disk ring 20 and thereby forms a stop configured to prevent upper magnet disk ring 20 from sliding upwards past rod top 30.

In embodiment, the proximity of lower magnet disk ring 22 to upper magnet disk ring 20 creates a repelling magnetic force 34, which is directed upwards and against upper magnet disk ring 20 and downwards against lower magnet disk ring 22. This causes upper magnet disk ring 20 to be pushed upwards against the bottom end of rod top 30 so that rod 26 and upper magnet disk ring 20 move vertically downwards (e.g., under the force of gravity) in unison. Likewise, the downwards force against lower magnet disk ring 22, may cause it to remain in place as it is pressed against rubber washer(s) 24. As such, when an object is hung on bottom hanging assembly 10B, the magnetic repulsion imposed on upper magnet disk ring 20 opposes the gravitation force causing rod 26 to be suspended in "floating" equilibrium. This minimizes frictional forces to a negligible level (i.e., air resistance) as rod 26 spins within tube 10.

It shall be appreciated that different methods of affixing upper magnet disk ring 20 to rod 26 may be employed to achieve similar results in alternate embodiments. For example, the respective diameters of rod 26 and the opening of upper magnet disk ring 20 may be sized for a friction fit, or adhesive or other attachment mechanism may be used to affix upper magnet disk ring 20 to rod 26.

In certain embodiments, top hanging assembly 10A may include a threaded hook 14 coupled to a top end of tube 10. In certain embodiments, top hanging assembly 10A may further include a cap 12 to which hook 14 may be secured. In embodiments, cap 12 may be configured to threadably connect to the top end of tube 10. However, different attachment mechanisms, which may be stronger or more permanent may be employed in alternate embodiments. In embodiments, cap 12 may further include a central opening configured to receive a bottom end of hook 14. The bottom end of hook 14 may include a threaded portion, which may be secured to cap 12 using elements such as washers 18 nuts 16 with may be threadably engaged with the threaded portion of hook 14 above and below cap 12, as shown. In some embodiments, washers 18 may be made of a rubber material which may help prevent water from entering the tube (e.g., in case of rain). In embodiments, hook 14 may be attached to an object such as a clothing line 40, rail, another hook, chair, roof gutter, ceiling, etc. In alternate embodiments, top hanging assembly may comprise an eye bolt 42 instead of hook 14, which may be similarly attached to tube 10. In further embodiments, an s-hook 44 may optionally be attached to eye bolt 42. It shall be appreciated that different mechanical components and/or arrangements may be employed for top hanging assembly 10A in alternate embodiments.

In certain embodiments, bottom hanging assembly 10B may comprise an attachment component 32 which may be coupled to the bottom end of rod 26. In one embodiment, attachment component 32 may be a split ring, which may be inserted into a hole 28 within rod 26 as shown in the figures. It shall be appreciated that different attachment components 32, such as a hook, eye bolt, and the like, may be used in alternate embodiments.

It shall be appreciated that rotating hanger device may be used in an upside down orientation, wherein the functions of bottom hanging assembly 10B and top hanging assembly 10A would be reversed. (However, in bad weather, i.e., rain, snow, it is preferable to use the device right side up to prevent water collecting in the tube).

In one embodiment, tube 10 may be made of a clear material such as plastic or glass, but different materials which may be opaque, refractive, or of other optical qualities may be used. In some embodiments, rod 26 and rod top 30 may be made of any rigid non-magnetic material(s), such as for example aluminum or plastic. Rod 26 may be a hollow tube in alternate embodiments. Upper magnet disk ring 20, and lower magnet disk ring 22 may be neodymium or other rare earth type magnets. In some embodiments, upper magnet disk ring 20 and lower magnet disk ring 22 may each comprise multiple magnet disk rings which are magnetically attached for increased magnetic strength for hanging much heavier objects. In one embodiment, upper magnet disk ring 20 and lower magnet disk ring 22 may each include two magnet disk rings as depicted in the figures but are not limited to this option. In one embodiment, the hanger device may comprise 3 bottom rubber washers 24 but is not limited to this option.

In embodiments, tube 10 may have a diameter slightly larger than the diameter of the magnetic discs. In one embodiment, magnet discs may each have an outer diameter of approximately 00.74 inches, and tube 10 may have an inner diameter of approximately 0.77 inches, and the height of the tube may be about 3 inches. However, a much larger device may be designed for heavier applications.

In embodiments, rotating hanger device 100 may be used for hanging items such as a clothing hanger hook 38 (as shown in the figures), art, a mobile for a crib, chimes, various optical objects such as lights including solar powered lights, mirrors, and the like. In some embodiments, rotating hanger device 100 may be sized for hanging large objects, such as a swing, crib, a wind turbine electrical generator (such as a Savonius vertical axis blades with an electrical turbine motor), etc.

It shall be appreciated that rotating hanger device 100 can have multiple configurations in different embodiments. It shall be appreciated that the components of rotating hanger device 100 may comprise any alternative known materials in the field and be of any size and/or dimensions. It shall be appreciated that the components of rotating hanger device 100 may be manufactured and assembled using any known techniques in the field. Furthermore, the components of rotating hanger device 100 may be provided as an assembled unit and/or as a kit for assembly by the end user, according to alternate embodiments.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A rotating hanger device, comprising:
a tube made of a non-magnetic material;
a rod supported within the tube via a magnetic levitation assembly housed within the tube; and
a bottom hanging assembly coupled to a bottom end of the rod, and configured for enabling items to be hung on the rotating hanger device,
wherein a longitudinal axis of the rod is oriented parallel to a longitudinal axis of the tube,
wherein the magnetic levitation assembly comprises at least one upper magnet disk ring and at least one lower magnet disk ring each including a central opening through which the rod is engaged,
wherein the upper magnet disk ring and the lower magnet disk ring face one another in a repelling orientation,
wherein the rod can move up and down and spin about its longitudinal axis with respect to the tube.

2. The rotating hanger device of claim 1, further comprising a top hanging assembly configured for enabling the rotating hanger device to be suspended from an object.

3. The rotating hanger device of claim 2, wherein the top hanging assembly comprises a hook, which is coupled into a top cap of the tube.

4. The rotating hanger device of claim 1, wherein a bottom section of the rod extends through an opening within a bottom end of the tube.

5. The rotating hanger device of claim 4, wherein the upper magnet disk ring is configured to move together with the rod.

6. The rotating hanger device of claim 5, further comprising a rod top coupled to a top end of the rod, the rod top to form a stop which prevents the upper magnet disk ring from sliding upwards past the stop.

7. The rotating hanger device of claim 4, wherein the lower magnet disk ring is supported on a bottom wall of the tube and/or on one or more rubber washers situated on the bottom wall, the bottom wall comprising said bottom opening through which the bottom section of the rod extends.

8. The rotating hanger device of claim 1, wherein the bottom hanging assembly comprises a ring inserted into a hole at the bottom end of the rod.

9. The rotating hanger device of claim 1, wherein the tube is made of a clear plastic, or a non-magnetic metal.

10. The rotating hanger device of claim 1, wherein the device is configured for hanging clothing.

11. The rotating hanger device of claim 1, wherein the magnetic levitation assembly comprises neodymium magnets.

* * * * *